(12) United States Patent
Shukla

(10) Patent No.: US 12,235,830 B2
(45) Date of Patent: Feb. 25, 2025

(54) VERIFYING STRUCTURED DATA

(71) Applicant: Google LLC, Mountain View, CA (US)

(72) Inventor: Parth Shukla, Pfaffikon (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/362,956

(22) Filed: Jul. 31, 2023

(65) Prior Publication Data

US 2023/0376478 A1 Nov. 23, 2023

Related U.S. Application Data

(63) Continuation of application No. 17/002,744, filed on Aug. 25, 2020, now Pat. No. 11,748,331, which is a (Continued)

(51) Int. Cl.
*G06F 16/23* (2019.01)
*G06F 21/55* (2013.01)
(Continued)

(52) U.S. Cl.
CPC ........ *G06F 16/2365* (2019.01); *G06F 21/552* (2013.01); *G06F 21/566* (2013.01);
(Continued)

(58) Field of Classification Search
CPC ............... G06F 16/2365; G06F 21/552; G06F 21/6227; G06F 21/51; G06F 21/566; G06F 21/572

(Continued)

(56) References Cited

U.S. PATENT DOCUMENTS 4,899,290 A 2/1990 Hartzband
5,557,780 A 9/1996 Edwards et al.
(Continued)

FOREIGN PATENT DOCUMENTS

CN 105122727 A 12/2015
JP 2012178079 A 9/2012
(Continued)

OTHER PUBLICATIONS

How to get only the "changed" values from two JSON objects; pp. 1-4, Kyle, Jan. 1, 2015.
(Continued)

*Primary Examiner* — Phuong Thao Cao
(74) *Attorney, Agent, or Firm* — Honigman LLP; Brett A. Krueger

(57) ABSTRACT

A method for verifying structured data includes receiving structured data, deconstructing the structured data into corresponding elements and obtaining standard structured data having corresponding standard elements. The method also includes comparing the elements of the structured data with the standard elements of the standard structured data to identify any element differences. For each element difference, the method includes comparing the element difference against a registry of element comparisons, determining whether the element difference is expected or unexpected based on a heuristic or at least one rule, and when the element difference is unexpected, generating a signal indicating the presence of an unexpected element in the structured data.

20 Claims, 9 Drawing Sheets

Related U.S. Application Data continuation of application No. 15/790,453, filed on Oct. 23, 2017, now Pat. No. 10,783,138.

(51) Int. Cl.
   *G06F 21/56* (2013.01)
   *G06F 21/62* (2013.01)
   *G06F 21/51* (2013.01)
   *G06F 21/57* (2013.01)

(52) U.S. Cl.
   CPC .......... *G06F 21/6227* (2013.01); *G06F 21/51* (2013.01); *G06F 21/572* (2013.01)

(58) Field of Classification Search
   USPC ........................................................ 707/690
   See application file for complete search history.

(56) References Cited

U.S. PATENT DOCUMENTS

| | | | |
|---|---|---|---|
| 6,098,071 | A | 8/2000 | Aoyama et al. |
| 6,560,620 | B1 | 5/2003 | Ching |
| 7,606,695 | B1 | 10/2009 | Nouri et al. |
| 7,870,439 | B2 * | 1/2011 | Fujiyama ............ G06F 11/1482 |
| | | | 714/11 |
| 8,078,909 | B1 | 12/2011 | Satish |
| 8,230,325 | B1 | 7/2012 | Sun et al. |
| 8,745,001 | B1 | 6/2014 | Goldschmidt |
| 9,536,109 | B2 | 1/2017 | Ciano et al. |
| 9,661,023 | B1 | 5/2017 | Fang et al. |
| 9,836,388 | B1 | 12/2017 | Moniz et al. |
| 9,836,499 | B1 | 12/2017 | Miliauskas |
| 11,361,381 | B1 * | 6/2022 | Lehmuth ................ G06F 16/212 |
| 2003/0050939 | A1 | 3/2003 | Dietz et al. |
| 2003/0084424 | A1 | 5/2003 | Reddy et al. |
| 2005/0039117 | A1 | 2/2005 | Lwo |
| 2005/0071217 | A1 | 3/2005 | Hoogs et al. |
| 2005/0097454 | A1 | 5/2005 | Kinno et al. |
| 2006/0253458 | A1 | 11/2006 | Dixon et al. |
| 2007/0049323 | A1 | 3/2007 | Wang et al. |
| 2008/0025556 | A1 | 1/2008 | Visan et al. |
| 2008/0028048 | A1 | 1/2008 | Shekar CS et al. |
| 2008/0046970 | A1 | 2/2008 | Oliver et al. |
| 2008/0082974 | A1 | 4/2008 | Ellison |
| 2008/0294659 | A1 | 11/2008 | Padmanabhuni et al. |
| 2009/0003663 | A1 * | 1/2009 | Webster .............. G06F 18/2415 |
| | | | 382/119 |
| 2009/0049028 | A1 | 2/2009 | Senthil |
| 2009/0133126 | A1 * | 5/2009 | Jang ........................ G06F 21/56 |
| | | | 726/24 |
| 2009/0201945 | A1 | 8/2009 | Llaurency |
| 2009/0243747 | A1 | 10/2009 | Gaidarzhy et al. |
| 2014/0201838 | A1 | 7/2014 | Varsanyi et al. |
| 2014/0257908 | A1 | 9/2014 | Steiner et al. |
| 2014/0331119 | A1 | 11/2014 | Dixon et al. |
| 2015/0012528 | A1 | 1/2015 | Kapadia |
| 2015/0213080 | A1 | 7/2015 | Wilson et al. |
| 2016/0057166 | A1 | 2/2016 | Chesla |
| 2016/0080345 | A1 | 3/2016 | Safruti et al. |
| 2016/0171634 | A1 * | 6/2016 | Laine ..................... G06Q 10/00 |
| | | | 705/311 |
| 2016/0226976 | A1 * | 8/2016 | Ciabarra, Jr. ........ G06F 16/1756 |
| 2016/0335897 | A1 * | 11/2016 | Naserian ................. H04W 4/46 |
| 2017/0293641 | A1 | 10/2017 | Denner et al. |
| 2017/0329814 | A1 * | 11/2017 | Shah .................. G06F 16/2365 |
| 2018/0115577 | A1 | 4/2018 | Shukla et al. |

FOREIGN PATENT DOCUMENTS

| | | | | |
|---|---|---|---|---|
| WO | WO-2014060964 A2 * | 4/2014 | .......... | G06F 21/552 |
| WO | 2014064777 A1 | 5/2014 | | |

OTHER PUBLICATIONS

International Search Report and Written Opinion for the related application No. PCT/US2018/041770 dated Sep. 11, 2018.
Chinese Office Action for the related application No. 201880036086.X.

* cited by examiner

VERIFYING STRUCTURED DATA

CROSS REFERENCE TO RELATED APPLICATIONS

This U.S. patent application is a continuation of, and claims priority under 35 U.S.C. § 120 from, U.S. patent application Ser. No. 17/002,744, filed on Aug. 25, 2020, which is a continuation of U.S. patent application Ser. No. 15/790,453, now U.S. Pat. No. 10,783,138, filed on Oct. 23, 2017. The disclosures of these prior applications are considered part of the disclosure of this application and are hereby incorporated by reference in their entireties.

TECHNICAL FIELD

This disclosure relates to verifying structured data.

BACKGROUND

Determining whether or not structured data on a computing device includes malicious or unexpected code can be difficult when the structured data includes mutable elements. For instance, binary data of a computing device associated with a manufacturer inevitably changes by some degree each time the computing device boots. As such, there may be differences between structured data samples taken from the same computing device at different times, or between structured data samples of the same type from different computing devices associated with the same manufacturer, that are not the result of the data being infected with bad or malicious code. Since some portions/elements of structured data are expected to change, and therefore permissible, merely identifying differences based on a comparison between structured data samples and standard structured data samples provided by a creator/manufacturer is not an accurate technique for identifying bad or malicious code. Accordingly, without information on which elements of a structured data sample may be different from other corresponding samples and/or may change over time, determining whether or not a structured data sample has been compromised based solely upon identified element differences in the structured data can be problematic. These difficulties are further compounded when verifying larger numbers of structured data samples, such as verifying structured data samples taken from multiple computing devices in a fleet.

SUMMARY

One aspect of the disclosure provides a method for verifying structured data. The method includes receiving, at data processing hardware, structured data. The method also includes deconstructing, by the data processing hardware, the structured data into corresponding elements. The method further includes obtaining, at the data processing hardware, standard structured data having corresponding standard elements. The method also includes comparing, by the data processing hardware, the elements of the structured data with the standard elements of the standard structured data to identify any element differences. For each element difference, the method includes: comparing, by the data processing hardware, the element difference against a registry of element comparisons; determining, by the data processing hardware, whether the element difference is expected or unexpected based on a heuristic or at least one rule; and when the element difference is unexpected, generating, by the data processing hardware, a signal indicating the presence of an unexpected element in the structured data.

Implementations of the disclosure may include one or more of the following optional features. In some examples, for each element difference, the method includes storing the corresponding comparison between the respective element of the structured data with the respective standard element of the standard structured data in the registry of element comparisons. Optionally, the method may further include statistically analyzing, by the data processing hardware, the registry of element comparisons to determine the at least one rule indicating whether the element difference is expected or unexpected.

In some implementations, for each element of the structured data, the method includes determining, by the data processing hardware, whether the element includes any sub-elements. When the element includes sub-elements, the method includes deconstructing, by the data processing hardware, the element into the corresponding sub-elements. Here, the deconstructed structured data may include a recursively extracted tree structure. The method may also include receiving, at the data processing hardware, a structured data type, and obtaining, at the data processing hardware, a data structure template based on the structured data type. The method may further include deconstructing, by the data processing hardware, the structured data into corresponding elements based on the data structure template, and determining, by the data processing hardware, whether the element includes any sub-elements based on the data structure template.

In some configurations, the method includes annotating each element of the structured data as matching, differing, missing, or extra based on the comparison of the respective element with the respective standard element. When comparing the elements of the structured data with the standard elements of the standard structured data, the method may include identifying a hash or a location of each element. For each element, the method may include identifying the corresponding standard element based on the hash or the location of each element, and determining whether data of the element is matching, differing, missing, or extra relative to standard data of the corresponding standard element. When determining whether the element difference is expected or unexpected, the method may include marking the annotation of the respective element as expected or unexpected. In some examples, the structured data includes binary data.

Another aspect of the disclosure provides a system for verifying structured data. The system includes data processing hardware and memory hardware in communication with the data processing hardware. The memory hardware stores instructions that when executed on the data processing hardware cause the data processing hardware to perform operations. The operations include receiving structured data, deconstructing the structured data into corresponding elements, obtaining standard structured data having corresponding standard elements, and comparing the elements of the structured data with the standard elements of the standard structured data to identify any element differences. For each element difference, the operations include comparing the element difference against a registry of element comparisons and determining whether the element difference is expected or unexpected based on a heuristic or at least one rule. When the element difference is unexpected, the operations include generating a signal indicating the presence of an unexpected element in the structured data.

Implementations of the disclosure may include one or more of the following optional features. In some implementations, for each element difference, the operations include storing the corresponding comparison between the respective element of the structured data with the respective standard element of the standard structured data in the registry of element comparisons. The operations may also include statistically analyzing the registry of element comparisons to determine the at least one rule indicating whether element difference is expected or unexpected.

In some examples, for each element, the operations include determining whether the element includes any sub-elements. When the element includes sub-elements, the operations include deconstructing the element into the corresponding sub-elements. The deconstructed structured data may include a recursively extracted tree structure. Additionally or alternatively, the operations may also include receiving a structured data type, obtaining a data structure template based on the structured data type, deconstructing the structured data into corresponding elements based on the data structure template, and determining whether the element includes any sub-elements based on the data structure template.

In some configurations, the operations include annotating each element of the structured data as matching, differing, missing, or extra based on the comparison of the respective element with the respective standard element. When comparing the elements of the structured data with the standard elements of the standard structured data, the operations may include identifying a hash or a location of each element. For each element, the operations may further include identifying the corresponding standard element based on the hash or the location of each element and determining whether data of the element is matching, differing, missing, or extra relative to standard data of the respective standard element. When determining whether the element difference is expected or unexpected, the operations may include marking the annotation of the respective element as expected or unexpected. In some implementations, the structured data includes binary data.

DESCRIPTION OF DRAWINGS

Like reference symbols in the various drawings indicate like elements.

DETAILED DESCRIPTION

Implementations herein are directed toward a verification pipeline configured to, inter alia, determine/detect whether or not structured data includes bad or malicious code that may compromise one or more workstations in a fleet operated by an entity. The structured data may include binary data, such as Basic Input/Output System (BIOS) data, that changes each time a workstation reboots. As a result, comparing elements of structured data with corresponding standard elements from a golden copy of the structured data may not always provide a one-to-one match. While these comparisons may reveal element differences, the element differences identified from structured data received from all the workstations within the fleet may be statistically analyzed so that whitelists can be automatically generated. These automatically-generated whitelists may specify whether or not an element difference is expected, i.e., due to mutations that are expected to occur, or unexpected, i.e., due to being infected by bad or malicious code. Moreover, as more structured data passes through the pipeline, existing whitelists may be updated to fine tune the verification process for determining whether or not an element difference is expected or unexpected. For instance, if the verification pipeline observes that a majority of samples of structured data in the fleet contain a corresponding element difference specified by a whitelist as being unexpected, the verification pipeline may update the whitelist so that the corresponding element difference is in fact expected. Implementations further include notifying an operator of the fleet (e.g., a verification device) when a presence of an unexpected element difference is detected. The operator of the fleet may assess whether or not the unexpected element difference is the result of bad or malicious code that may compromise the workstations in the fleet.

Figure 1:
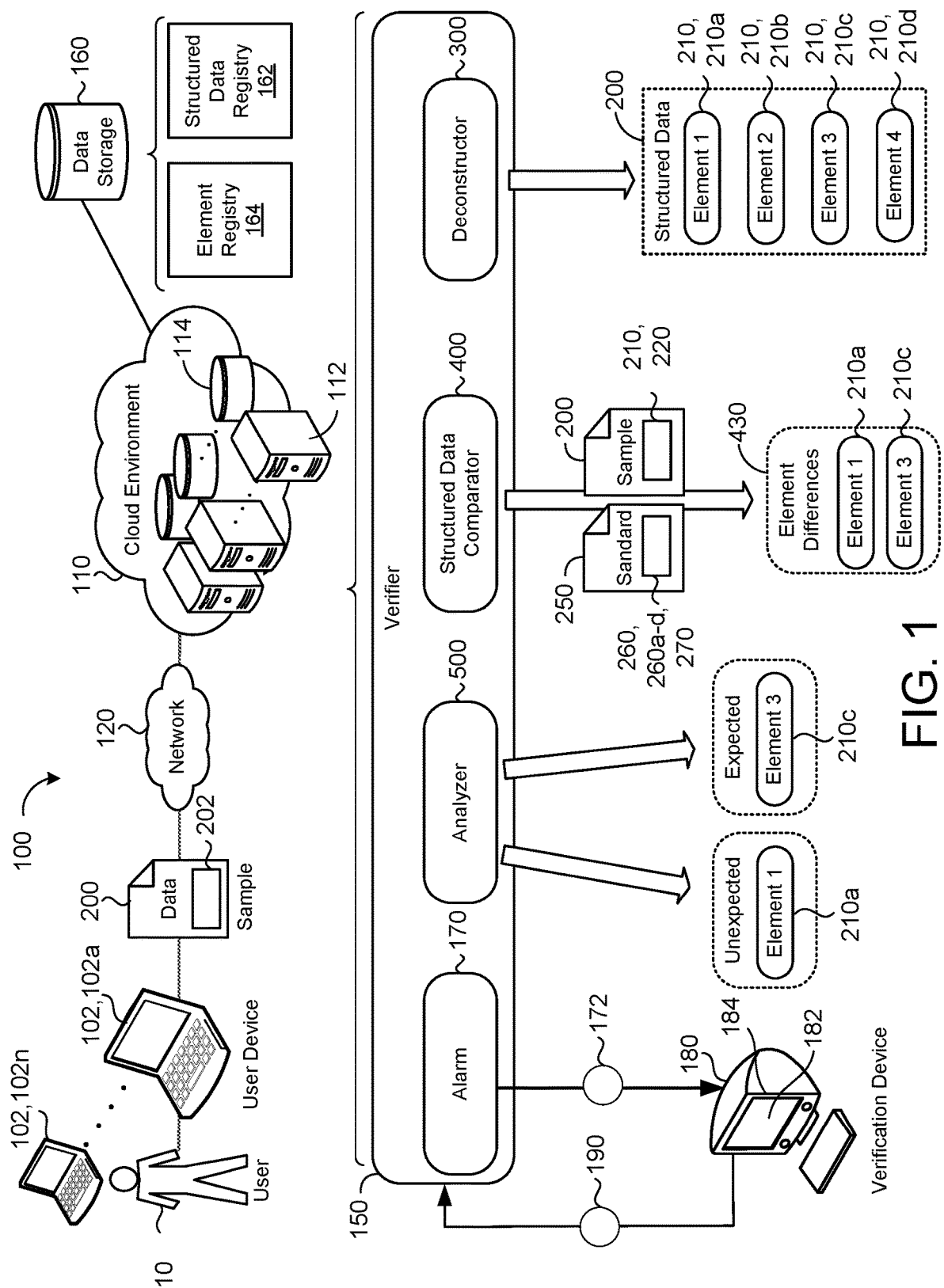
FIG. 1 is a schematic view of an example system for verifying structured data.

Referring to FIG. 1, in some implementations, an example system 100 includes one or more user devices 102, 102*a*—n each associated with a respective user 10 and in communication with a remote system 110 via a network 120. Each user device 102 may correspond to a computing device, such as a desktop workstation or laptop workstation. The remote system 110 may be a distributed system (e.g., a cloud environment) having scalable/elastic computing resources 112 (e.g., data processing hardware) and/or storage resources 114. The computing resources 112 and/or storage resources 114 may also communicate with a verification device 180 over the network 120. In some implementations, computing resources 112 of the remote system 110 execute a verifier 150 that receives a sample of structured data 200 from one or more user devices 102. For example, an entity operating the remote system 110 may own a fleet of user devices 102 each associated with a corresponding user 10 employed by the entity, and each user device 102 may provide the sample of structured data 200 to the verifier 150 for verifying that the contents of the structured data 200 have not been compromised. To put another way, the verifier 150 determines whether or not the structured data 200 has been infected with bad or malicious code that may compromise the user device 102 sourcing the structured data 200 and/or compromise multiple user devices 102 among a fleet in communication with each other via the network 120. In some examples, the storage resources 114 implement data storage hardware 160 and the data processing hardware 112 is in communication with the data storage hardware 160.

In some implementations, the verification device 180 is in communication with the verifier 150 (e.g., via the network 120) and provides one or more inputs 190 to the verifier 150. For instance, the verification device 180 may send an input 190 to the verifier 150 requesting verification of structured data 200 from one or more user devices 102 in the fleet. The verification device 180 may execute a user interface 182 on a display 184 of the verification device 180 to allow an operator of the verification device 180 to communicate with the verifier 150. Described in greater detail below, the inputs 190 may further include thresholds/constraints for determining whether the structured data 200 includes any element differences 430 when compared to corresponding standard structured data 250. The thresholds/constraints may include a percentage of acceptability to determine whether the structured data 200 is matching or differing. The inputs 190 may further include a heuristic or at least one rule for determining whether an identified element difference 430 is unexpected or expected.

Figure 2:
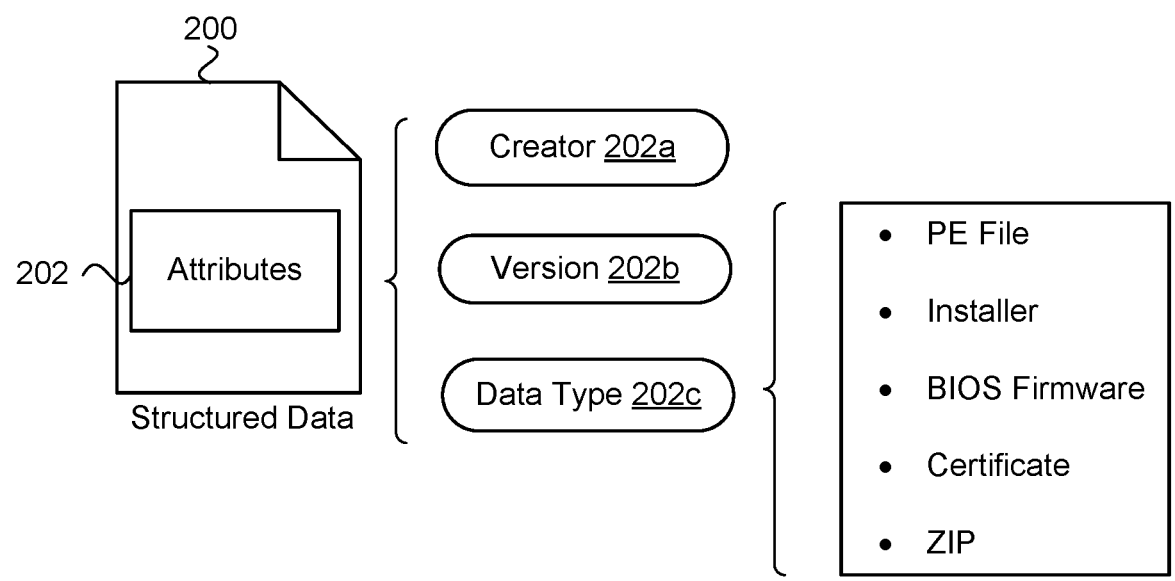
FIG. 2 is a schematic view of attributes associated with structured data.

The structured data 200 is associated with one or more attributes 202. Referring to FIG. 2, in some implementations, the attributes 202 of the structured data 200 include at least one of creator information 202a, version information 202b, or a data type 202c. The creator information 202a may indicate a creator/manufacturer of the user device 102 sourcing the structured data 200 while the version information 202b may indicate a version associated with the structured data 200. The data type 202c specifies the type of data the structured data 200 represents. For instance, the data type 202c may indicate that the structured data 200 represents a Portable Executable (PE) file that encapsulates executable code for loading an operating system on the user device 102. The data type 202c may further indicate that the structured data 200 is associated with an installer, certificate, a zip file, or Basic Input/Output System (BIOS) firmware. BIOS firmware may be pre-installed on the user device 102 by a manufacturer thereof (e.g., as specified by the creator information 202a) for use in performing hardware initialization during the booting process and/or providing runtime services for operating systems and programs executing on the user device 102. Structured data 200 associated with BIOS firmware is generally mutable as portions/elements of the structured data 200 may change each time the user device 102 re-boots.

Referring back to FIG. 1, in some implementations, the verifier 150 of the data processing hardware 112 implements a deconstructor 300, a structured data comparator 400, and an element difference analyzer 500. The deconstructor 300 is configured to deconstruct/extract the structured data 200 received from the user device 102 into corresponding data elements 210, 210a—d. In the example shown, the deconstructed structured data 200 includes a first element 210a, a second element 210b, a third element 210c, and a fourth element 210d. Other examples may include the deconstructor 300 deconstructing each sample of structured data 200 into any number of data elements 210 corresponding to the structured data 200 under deconstruction. In some implementations, the deconstructed structured data 200 includes a recursively extracted tree structure.

Figure 3:
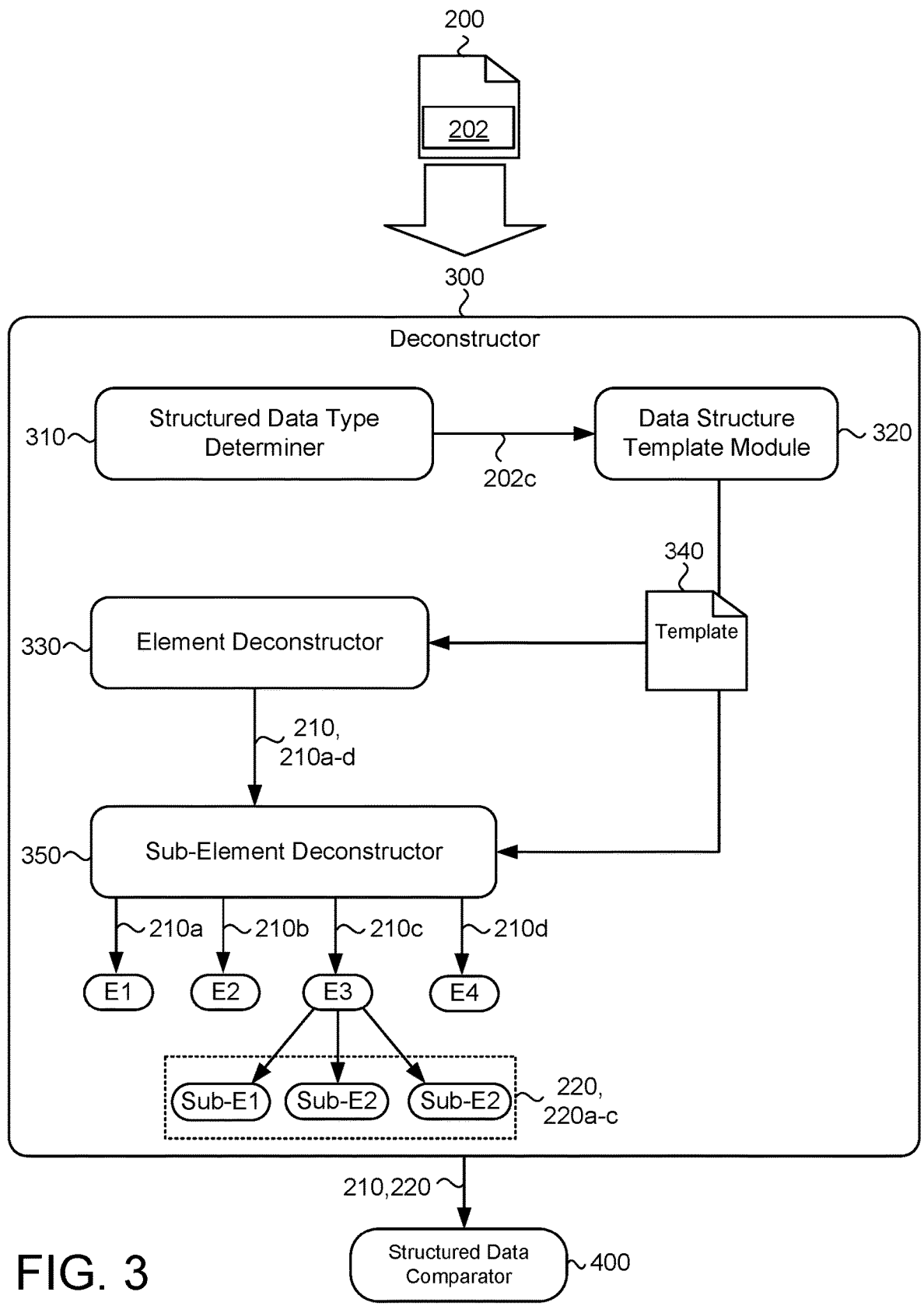
FIG. 3 is a schematic view of example components of a deconstructor of the system of FIG. 1.

Referring to FIG. 3, in some implementations, the deconstructor 300 includes a structured data type determiner 310 that determines the data type 202c of the received sample of structured data 200, and then provides the data type 202c to a data structure template module 320 configured to obtain a data structure template 340 based on the data type 202c. The data structure template 340 may be provided from the creator/manufacturer of the user device 102 that is the source of the structured data 200. Moreover, the structured data type determiner 310 may also determine the creator information 202a and the version information 202b of the sample of structured data 200 for obtaining the data structure template 340. Here, the data structure template 340 may provide instructions for deconstructing the structured data 200 into the corresponding data elements 210. The data structure template module 320 may reside on the data storage hardware 160 and may store multiple data structure templates 340 each associated with a corresponding data type 202c (and optionally a corresponding creator 202a and/or version 202b) that provide instructions for deconstructing/extracting the structured data 200 of the corresponding data type 202c. For instance, the structured data 200 may be a recursively extracted tree structure and the template 340 may be used to deconstruct the structured data 200. The deconstructor 300 may further include an element deconstructor 330 that uses the data structure template 340 to deconstruct/extract the structured data 200 into the corresponding data elements 210, 210a—d (e.g., E1, E2, E3, E4). In some examples, the element deconstructor 330 executes an appropriate parser configured to deconstruct/extract the structured data 200 into the corresponding data elements 210.

In some implementations, the deconstructor 300 also implements a sub-element deconstructor 350 that determines whether or not any of the data elements 210 include any sub-elements 220, 220a—c, and for each data element 210 that includes sub-elements 220, deconstructs the data element 210 into the corresponding sub-elements 220. In the example shown, the sub-element deconstructor 350 determines the third element 210c includes sub-elements 220, 220a—c and deconstructs the sub-elements 220 (e.g., Sub-E1 220a, Sub-E2 220b, Sub-E3 220c) from the third element 210c. The sub-element deconstructor 350 may further determine that the sub-elements 220 are of a data type 202c (e.g., as indicated by the data structure template 340) that requires further extraction/deconstruction. Accordingly, the element deconstructor 330 and the sub-element deconstructor 350 may include appropriate parsers for recursively extracting all of the elements 210 and sub-elements 220 until no more parsing is possible. For instance, structured data 200 having a data type 202c indicative of BIOS firmware or a zip file may necessitate further extraction of sub-elements 220 from within one or more of the data elements 210. Thereafter, the deconstructor 300 may provide the elements 210 and sub-elements 220 (if any) to the structured data comparator 400.

Referring back to FIG. 1, the structured data comparator 400 is configured to obtain standard structured data 250 having corresponding standard elements 260, 260a—d and compare the elements 210 of the structured data 200 with the standard elements 260 of the standard structured data 250 to identify any element differences 430 therebetween. When the deconstructor 300 has deconstructed sub-elements 220 from one or more of the elements 210 of the structured data 200, the structured data comparator 400 may further compare the sub-elements 220 with standard-sub elements 270 of the standard elements 260 to identify element differences 430 therebetween. As used herein, "standard structured data 250" refers to a golden copy (for example, a master, authoritative, and/or approved copy) of structured data provided by a manufacturer/creator that specifies paths, hashes, values, objects or other information or data for each standard element 260 (and sub-element 270) associated therewith. The data processing hardware 112 may obtain multiple sets of standard structured data 250 from one or more manufacturers/creators and store each set of standard structured data 250 within a structured data registry 162 on the data storage hardware 160. Here, each set of standard structured data 250 may include corresponding attributes 202 so that each set of standard structured data 250 is associated with a corresponding manufacturer/creator (e.g., using creator information 202a), a corresponding version (e.g., using version information 202b), and/or a corresponding data type 202c. The structured data registry 162 may be continuously updated by the data processing hardware 112 as manufacturers/creators provide new sets of standard structured data 250. For instance, new standard structure data 250 associated with BIOS firmware may be uploaded to the structured data registry 162 each time the manufacturer creates a new version of the BIOS firmware.

Figure 4:
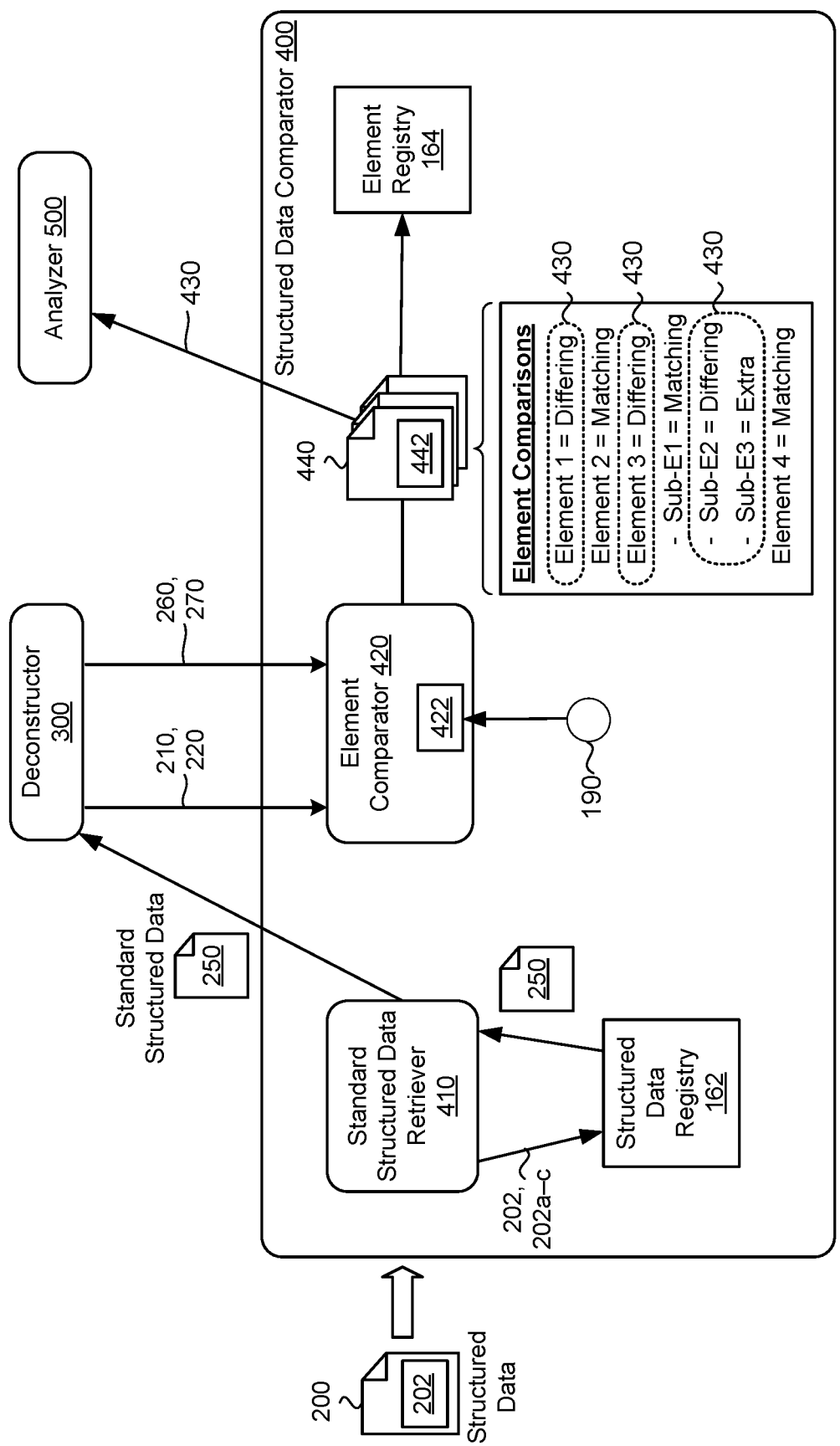
FIG. 4 is a schematic view of example components of a structured data comparator of the system of FIG. 1.

Referring to FIG. 4, in some implementations, the structured data comparator 400 includes a standard structured data retriever 410 for retrieving corresponding standard structured data 250 from the structured data registry 162 using one or more of the attributes 202 of the sample of structured data 200. For instance, the retriever 410 may identify the corresponding standard structured data 250 for retrieval from the structured data registry 162 as having the same data type 202c, the same version 202b, and the same creator 202a as the sample of structured data 200. Upon obtaining the standard structured data 250 from the registry 162, the retriever 410 may provide the standard structured data 250 to the deconstructor 300 for deconstructing/extracting the standard structured data 250 into the corresponding standard elements 260 (and any standard sub-elements 270), as discussed above in FIG. 3 with respect to the sample of structured data 200. An element comparator 420 may receive the elements/sub-elements 210, 220 of the sample of structured data 200 and the standard elements/sub-elements 260, 270 of the standard structured data 250 after the deconstructor 300 deconstructs respective ones of the structured data 200 and the standard structured data 250.

The element comparator 420 is configured to compare the elements/sub-elements 210, 220 of the structured data 200 to the corresponding standard elements/sub-elements 260, 270 of the standard structured data 250 on an element-by-element basis to identify element differences 430. In some examples, the element comparator 420 identifies a hash or location of each element/sub-element 210, 220 within the structured data 200 (e.g., recursively extracted tree structure) and then identifies the corresponding standard element/sub-element 260, 270 for comparison with the element/sub-element 210, 220 based on the hash or location thereof. For instance, the element comparator 420 may compare each element/sub-element 210, 220 to the corresponding standard element/sub-element 260, 270 to determine a corresponding element comparison 440 indicating whether data of the element/sub-element 210, 220 is matching, differing, missing, or extra relative to standard data of the corresponding standard element/sub-element 260, 270. Accordingly, the element comparator 420 may output a list of element comparisons 440 with each element comparison 440 annotating a comparison result between a corresponding element/sub-element 210, 220 and a corresponding standard element/sub-element 260, 270 as either matching, differing, missing, or extra.

In some configurations, the element comparator 420 includes a threshold module 422 to set tolerances/constraints for how much (e.g., a percentage of acceptability) an element/sub-element 210, 220 can differ from a corresponding standard element/sub-element 260, 270 and still be annotated as "matching". In these configurations, the element comparator 420 may employ the threshold module 422 to fine tune the tolerance/constraint of each element comparison 440 to initially require the element/sub-element 210, 220 to be within strict bounds (e.g., narrow set of tolerances/constraints) of the corresponding standard element/sub-element 260, 270 and subsequently permit the element/sub-element 210, 220 to deviate by some degree (e.g., wide set of tolerance/constraints) from the standard element/sub-element 260, 270. For instance, if the element comparator 420 is determining that multiple samples of the same structured data 200, e.g., where each sample is sourced from a different user device 102, are consistently (or by some configurable threshold) returning "differing" element comparisons 440, then the threshold module 422 may widen the tolerance/constraints to determine if subsequent results of the same element comparisons 440 change to "matching" or remain as "differing". Accordingly, each element comparison 440 may identify the element difference 430 (e.g., differing) when a narrow set of tolerance/constraints are used in the comparison but annotate the element comparison 440 as "matching" when the wider set of tolerance/constraints are used in the comparison. Thus, the verifier 150 may allow the element comparator 420 to self-learn for improving the accuracy and reliability as more samples of the structured data 200 pass through the comparator 420. In some examples, the verification device 180 (FIG. 1) provides tolerance/constraint inputs 190 to the threshold module 422 for setting initial tolerances/constraints for each element comparison 440 and/or modifying existing tolerances/constraints.

In the example shown, the list of element comparisons 440 indicates data of the first and third elements (e.g., first element 210a and third element 210c in FIG. 1) are "differing" relative to corresponding standard data of corresponding first and third standard elements 260 of the standard structured data 250. Here, each of the "differing" annotations of the element comparisons 440 for elements 1 and 3 are identified as a corresponding element difference 430. Moreover, the element comparisons 440 further indicate that data of the first sub-element Sub-E1 220a (FIG. 3) of the third element 210c is "matching" relative to corresponding standard data of a corresponding standard sub-element 270, data of the second sub-element Sub-E2 220b (FIG. 3) of the third element 210c is "differing" relative to corresponding standard data of a corresponding standard sub-element 270, and data of the third sub-element Sub-E3 220c (FIG. 3) of the third element 210c is "extra" indicating that the standard structured data 250 does not include a sub-element 270 corresponding to Sub-E3 220c. In some examples, any sub-elements 220 annotated as "extra" or "missing" are identified as a corresponding element difference 430. An annotation of "missing" may indicate that extraction/deconstruction of the structured data 200 does not produce a corresponding element/sub-element 210, 220 that surfaces in the standard structured data 250. The element comparator 420 may store each of the annotated element comparisons 440 in a registry of element comparisons 164 and provide the annotated element comparisons 440 to the analyzer 500 for determining whether each element difference 430 is expected or unexpected based on a heuristic or at least one rule. Each element comparison 440 may include a corresponding identifier 442 indicating the hash or location of the element/sub-element 210, 220 associated with element comparison 440.

Mutable types of structured data 200 (e.g., BIOS firmware) are expected to change by some extent each time the user device 102 reboots. For instance, BIOS firmware may contain an area to store machine specific settings which will be different for each BIOS firmware sample of structured data 200 when compared with corresponding standard structured data 250. As a result, an element difference 430 identified in an element comparison 440 between an element/sub-element 210, 220 and a corresponding standard element/sub-element 260, 270 may be expected, and therefore, not indicative of the element/sub-element 210, 220 containing bad or malicious code. Referring back to FIG. 1, the analyzer 500 is configured to determine, for each element difference 430 identified by the structured data comparator 400, whether the element difference 430 is "expected" or "unexpected". Here, an element difference 430 that is "expected" can be deemed allowable, or verified, by the verifier 150. On the other hand, an element difference 430 that is "unexpected" is flagged by the verifier 150 as being suspicious and provided to an alarm module 170 for generating a signal 172 indicating the presence of an unexpected element/sub-element 210, 220 in the structured data 200. The alarm module 170 may send the signal 172 to the verification device 180 requesting verification (e.g., via a corresponding input 190) of the sample of structured data 200 sourced from the user device 102. When the signal 172 is received, the user interface 182 executing on the verification device 180 may display the indication of the presence of the unexpected element/sub-element 210, 220 in the structured data 200 on the display 184. In the example shown, the analyzer 500 determines that the element difference 430 for the first element 210a is "unexpected" and that the element difference 430 for the third element 210c is "expected". Accordingly, the alarm module 170 may generate a signal 172 indicating the presence of the unexpected first element 210a to notify the verification device 180 that the first element 210a of the structured data 200 may include bad or malicious code that may compromise the user device(s) 102.

Implementations herein are directed toward a self-learning analyzer 500 having heuristic capabilities to not only identify when an element difference 430 is expected or unexpected based on the heuristic or the at least one rule, but to also allow changes/updates to the rule and/or allow identified element differences 430 to change from being "unexpected" to "expected" through statistical analysis of the registry of element comparisons 164. For instance, the registry of element comparisons 164 may update continuously as more samples of structured data 200 are received from user devices 102 and pass through the verifier 150. By statistically analyzing a most current state of the registry of element comparisons 164, the analyzer 500 may update an element difference 430 identified as "unexpected" to now be "expected" when a threshold number and/or threshold percentage of other user devices 102 also source the same element difference 430. In some examples, the heuristic rule may indicate that an element difference 430 identified in an element comparison 440 under a wide set of tolerances/constraints is "unexpected" while identifying the element difference 430 under a narrower set of tolerances/constraints is "expected". Accordingly, the tolerances/constraints used by the threshold module 422 of the element comparator 420 may interact or link to the rules indicating whether or not a corresponding element difference 430 is "unexpected" or "expected".

Figure 5A:
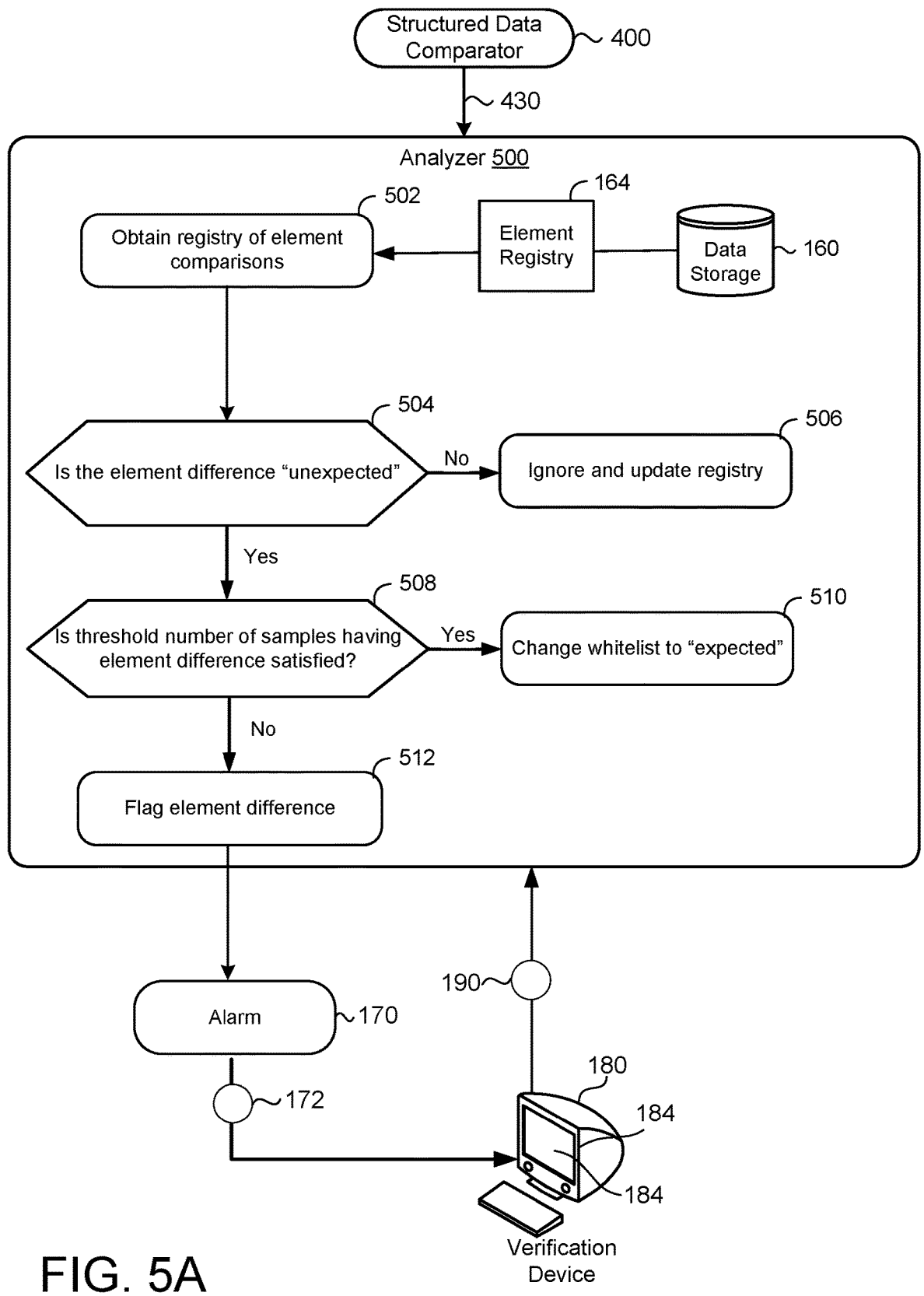
FIG. 5A is a schematic view of an example analyzation process for determining whether or not an identified element difference in the structured data is expected or unexpected.
Figure 5B:
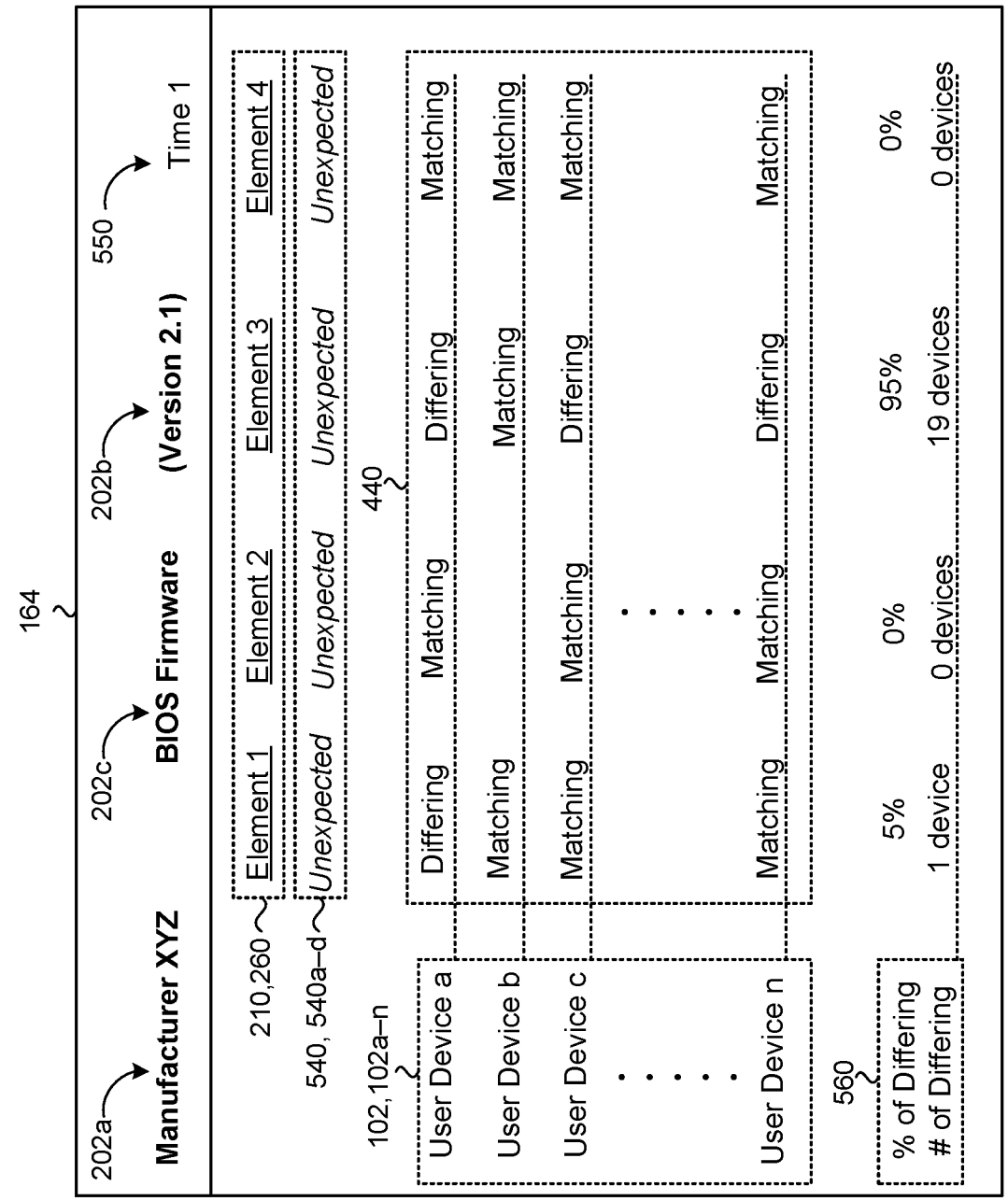
FIGS. 5B and 5C are schematic views of an example registry of element comparisons.
Figure 5C:
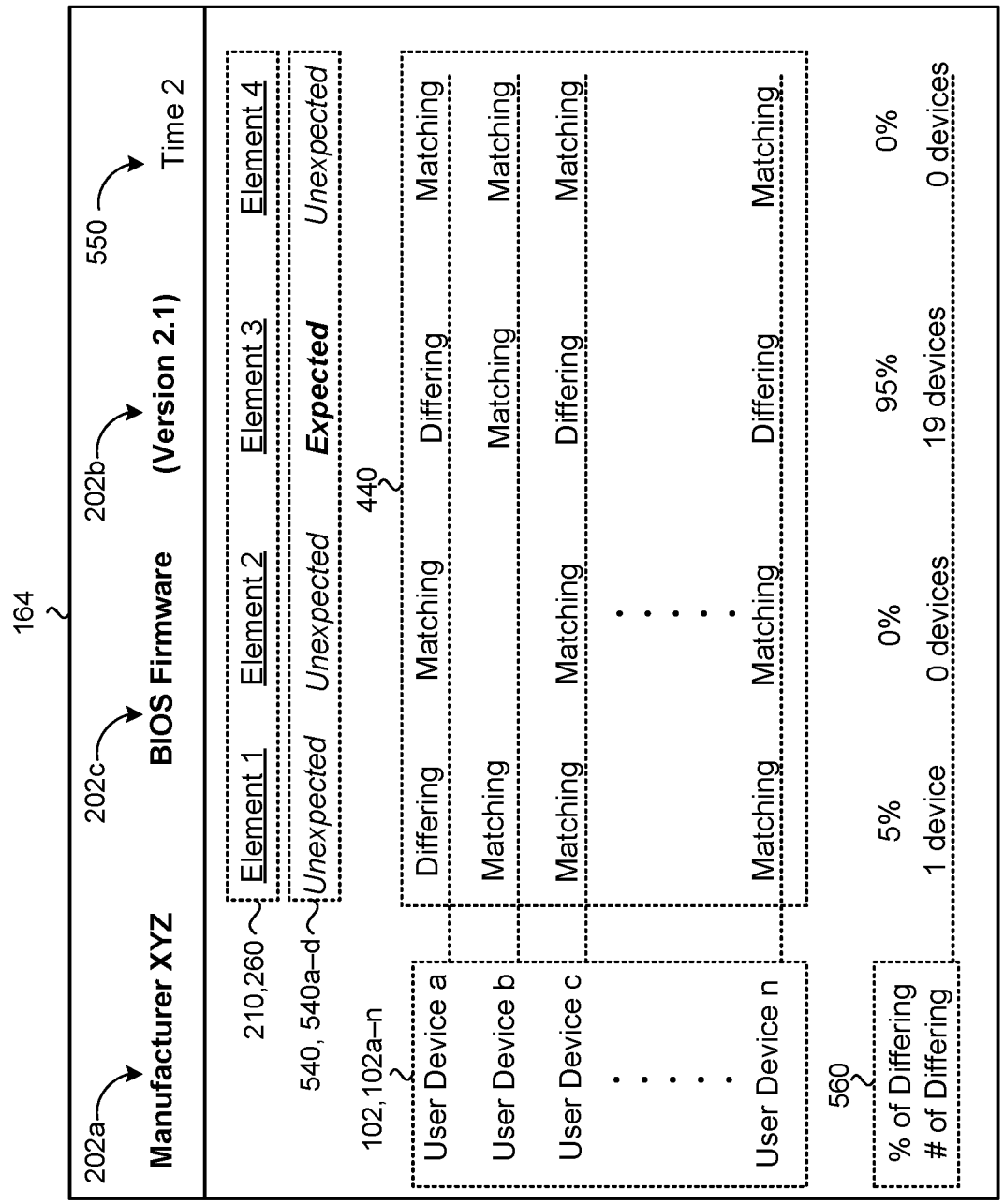

Referring to FIGS. 5A-5C, the analyzer 500 performs an example analyzation process for determining whether each element difference 430 identified by the structured data comparator 400 is expected or unexpected based on a comparison against the registry of element comparisons 164. FIGS. 5B and 5C show an example registry of element comparisons 164 corresponding to structured data 200 associated with the attributes 202 of manufacturer/creator 202a ("Manufacturer XYZ"), data type 202c ("BIOS Firmware"), and version 202b ("Version 2.1"). The registry of element comparisons 164 stores the results of element comparisons 440 (i.e., from the structured data comparator 400) between elements 210 of the structured data 200 and corresponding standard elements 260 of the standard structured data 250.

The standard structured data 250 may be provided by the creator/manufacturer, e.g., "Manufacturer XYZ", of multiple user devices 102, 102a—n that source the samples of the structured data 200. The registry of element comparisons 164 may include a timestamp 550. FIG. 5B includes the registry of element comparisons 164 including a timestamp 550 at a first time (Time 1) and FIG. 5C includes the registry of element comparisons 164 including a timestamp 550 at a second time (Time 2) occurring after Time 1.

The multiple user devices 102a—n may each be manufactured by the "Manufacturer XYZ" and belong to a fleet of user devices 102 owned and operated by an entity associated with the verification device 180. For simplicity, the registry of element comparisons 164 depicts four element comparisons 440 associated with Elements 1-4 of the structured data 200 provided by each user device 102 in the fleet and corresponding standard structured data 250 having the same manufacturer/creator, version, and data type attributes 202, 202a—c as the structured data. Here, each element comparison 440 annotates a corresponding comparison result for each of the Elements 1-4 from each of the user devices 102a—n as either Matching or Differing. However, the registry of element comparisons 164 may include more or less element comparisons 440 each associated with corresponding elements 210, 260 or any sub-elements 220, 270 deconstructed (e.g., via the deconstructor 300) from each sample of structured data 200 and the standard structured data 250. Accordingly, recursively extracted tree structures requiring element comparisons 440 between sub-elements 220 and corresponding standard sub-elements 270 may include corresponding comparison results annotated as either matching, differing, missing, or extra. Each element comparison 440 stored by the registry of element comparisons 164 may include the corresponding identifier 442 (FIG. 4) indicating the hash or location of the element/sub-element 210, 220 associated with the element comparison 440. The registry of element comparisons 164 further includes a counter 560 that indicates at least one of a percentage of user devices 102 in the fleet or a number of user devices 102 in the fleet that return an element comparison 440 annotated as "differing" for each element comparison 440 associated with Elements 1-4. Other counters 560 may similarly be assigned to other annotations, such as, "matching", "extra", or "missing". For instance, the verification device 180 may provide inputs 190 that assign annotations for the counter 560 to count.

Still referring to FIGS. 5B and 5C, the example registry of element comparisons 164 further includes a corresponding whitelist 540, 540a—d for each element comparison 440 that provides a rule indicating whether an identified element difference 430 is Expected or Unexpected. Thus, each whitelist 540 codifies what changes (e.g., element differences 430) are expected and acceptable, and what changes are unexpected and need to be flagged as possibly including bad or malicious code. In the example shown, the element comparison 440 for each of Elements 1-4 includes a corresponding whitelist 540a—d. In FIG. 5B, the registry of element comparisons 164 at Time 1 includes the first, second, third, and fourth whitelists 540a, 540b, 540c, 540d for Elements 1, 2, 3, 4 all including a corresponding rule that indicates that any element comparisons 440 annotated as "differing" are Unexpected. Accordingly, the whitelists 540a—d at Time 1 may be initially set with the rule that any element comparison 440 annotated as "differing" is Unexpected. In some examples, the verification device 180 sets the rules for the different annotations as being Unexpected or Expected. In other examples, the manufacturer/creator 202a associated with the registry of element comparisons 164 provides initial sets of the whitelists 540 for one or more of the Elements 1, 2, 3, 4 that may indicate when element differences 430 are Unexpected or Expected. In these examples, the whitelists 540 may be updated through the statistical analysis of the element comparisons 440 for all of the samples of structured data 200. In some scenarios, a whitelist 540 indicates that an element difference 430 annotated as "differing" is Expected but an element difference 430 annotated as "missing" or "extra" is Unexpected.

While conventional whitelists are manually created by humans, the analyzer 500 (e.g., data processing hardware 112) may automatically generate whitelists 540 and/or continuously update existing whitelists 540 for samples of structured data 200 associated with a particular set of one or more unique attributes 202, 202a—c. Thus, while the manually-created conventional whitelists include "static" rules that never change, the rules assigned to whitelists 540 may be automatically generated and/or dynamically updated by statistically analyzing the most recent element comparisons 440 stored in the registry of element comparisons 164. Having the ability to automatically generate and continuously update multiple whitelists 540 vastly improves processing times and accuracy for verifying structured data 200 compared to relying on manually-created conventional whitelists that include static rules without the ability to adapt or be tuned for accuracy. For example, while FIG. 5B shows the third whitelist 540c at Time 1 including the rule that the annotation of "differing" for the element comparison 440 associated with Element 3 is Unexpected, FIG. 5C shows the third whitelist 540c updating the rule at Time 2 to now be Expected after the registry of element comparisons 164 determines that a threshold number of samples also include the corresponding element comparison 440 that annotates Element 3 as "Differing". For instance, when the counter 560 of the registry of element comparisons 164 identifies that Element 3 is annotated as "differing" in at least 95-percent (95%) of the user devices 102 in the fleet, the registry of element comparisons 164 may update the third whitelist 540c so that any subsequent "differing" comparisons associated with Element 3 are Expected. The verification device 180 may send an input 190 to the analyzer 500 that includes a value for the "threshold number of samples" to change a corresponding rule of a whitelist 540 from Unexpected to Expected. The threshold number of samples associated with one whitelist 540 may be the same or different from the threshold number of samples associated with other whitelists 540.

On the other hand, as the counter 560 of the registry of element comparisons 164 identifies that Element 1 is annotated as "differing" in only 5-percent (5%) of the fleet of user devices 102, the registry of element comparisons 164 will maintain the first whitelist 540a at Time 2 (FIG. 5C) since the threshold number of samples (e.g., at least 95% of the fleet of user devices 102) annotating Element 1 as "differing" is not satisfied. Here, only the first user device 102a includes the first Element 1 annotated as "Differing". Accordingly, the alarm module 170 may generate the signal 172 indicating the presence of an unexpected Element 1 (e.g., the first element 210a of FIG. 1) in the structured data 200. The verification device 180 may assess the signal 172 to determine whether or not the unexpected Element 1 is the result of being infected with bad or malicious code. In some implementations, the analyzer 500 waits until all samples of the same structured data 200 from the user devices 102 in the fleet have passed through the verifier 150 to avoid prematurely sending signals 172 to the verification device 180.

Referring back to the analyzation process of FIG. 5A, the analyzer 500 first determines whether each element difference 430 associated with the sample of structured data 200 received from the first user device 102a (User Device a) is expected or unexpected based on the comparison against the registry of element comparisons 164. Here, an element difference 430 is identified for each of Elements 1 and 3 since Elements 1 and 3 are both annotated as "differing". At step 502, the analyzation process obtains the registry of element comparisons 164 from the data storage hardware 160 based on the attributes 202 of the sample of the structured data 200. In these examples, the "registry of element comparisons 164" corresponds to the registry of element comparisons 164 of FIG. 5C at Time 2.

At step 504, the analyzation process compares the element difference 430 against the registry of element comparisons 164 to determine if the "differing" element difference 430 is "unexpected". For instance, the corresponding whitelist 540 may include the corresponding rule that indicates whether the "Differing" element difference 430 is "unexpected" or "expected". For instance, the first whitelist 540a for Element 1 includes the rule indicating that the "Differing" element difference 430 is "unexpected", while the third whitelist 540c for Element 3 includes the rule indicating that the "Differing" element difference 430 is "expected".

When the analyzation process determines that the element difference 430 is "expected", i.e., step 504 is "No", then the analyzation process proceeds to step 506 and ignores the element difference 430 and updates the registry 164 to indicate that the element difference 430 is "expected". For the element difference 430 associated with Element 3, the analyzer 500 determines that the "Differing" element difference 430 is "expected", i.e., step 504 is "No". Conversely, when the analyzation process determines that the element difference 430 is "unexpected", i.e., step 504 is "Yes", then the analyzation process proceeds to step 508 to determine whether or not a threshold number of samples also include the corresponding element difference 430. For the element difference 430 associated with Element 1, the analyzation process determines that the "Differing" element difference 430 is "unexpected", i.e., step 504 is "Yes" and proceeds to step 508.

At step 508, the analyzer 500 may review the counter 560 of the registry of element comparisons 164 that indicates at least one of a percentage of the user devices 102 in the fleet or a number of the user devices 102 in the fleet that return the corresponding element difference 430, i.e., the "Differing" element difference 430 associated with Element 1. For the element difference 430 associated with Element 1, the counter 560 indicates that 5-percent (5%), or one (1) user device 102, in the fleet user devices 102 includes the corresponding "Differing" element difference 430. In some examples, the "threshold number of samples" includes at least 90- or 95-percent of the user devices 102 in the fleet to return the element difference 430. Additionally, the "threshold number of samples" may also require at least a minimum number of devices 102 in the fleet to return the corresponding element difference 430 before the threshold is satisfied. For instance, the minimum number may be about 10 devices to make sure that the number of samples is robust before overturning a rule specified by the whitelist 540. If the threshold number of samples is satisfied, i.e., step 508 is "Yes", then the analyzation process proceeds to step 510 and changes the rule of the corresponding whitelist 540 from "unexpected" to "expected".

If on the other hand, the threshold number of samples is not satisfied, i.e., step 508 is "No", then the analyzation process proceeds to step 512 and flags the corresponding element difference 430 as being "unexpected". Since the counter 560 of the registry of element comparisons 164 identifies that Element 1 is annotated as "differing" in only 5-percent (5%) of the fleet of user devices 102, the analyzation process may determine that the threshold number of samples is not satisfied. Accordingly, the analyzation process may flag the corresponding "Differing" element difference 430 associated with Element 1 and notify the alarm module 170. The alarm module 170 may generate the signal 172 indicating the presence of the unexpected element (Element 1) in the structured data 200 received from the first user device 102*a*. The verification device 180 may receive the signal 172 to determine whether or not the first user device 102*a* has been compromised as a result of bad or malicious code identified by the element difference associated with Element 1. The analyzation process executing by the analyzer 500 may repeat for each sample of the structured data 200 received from the other user devices 102*b*—n in the fleet.

Figure 6:
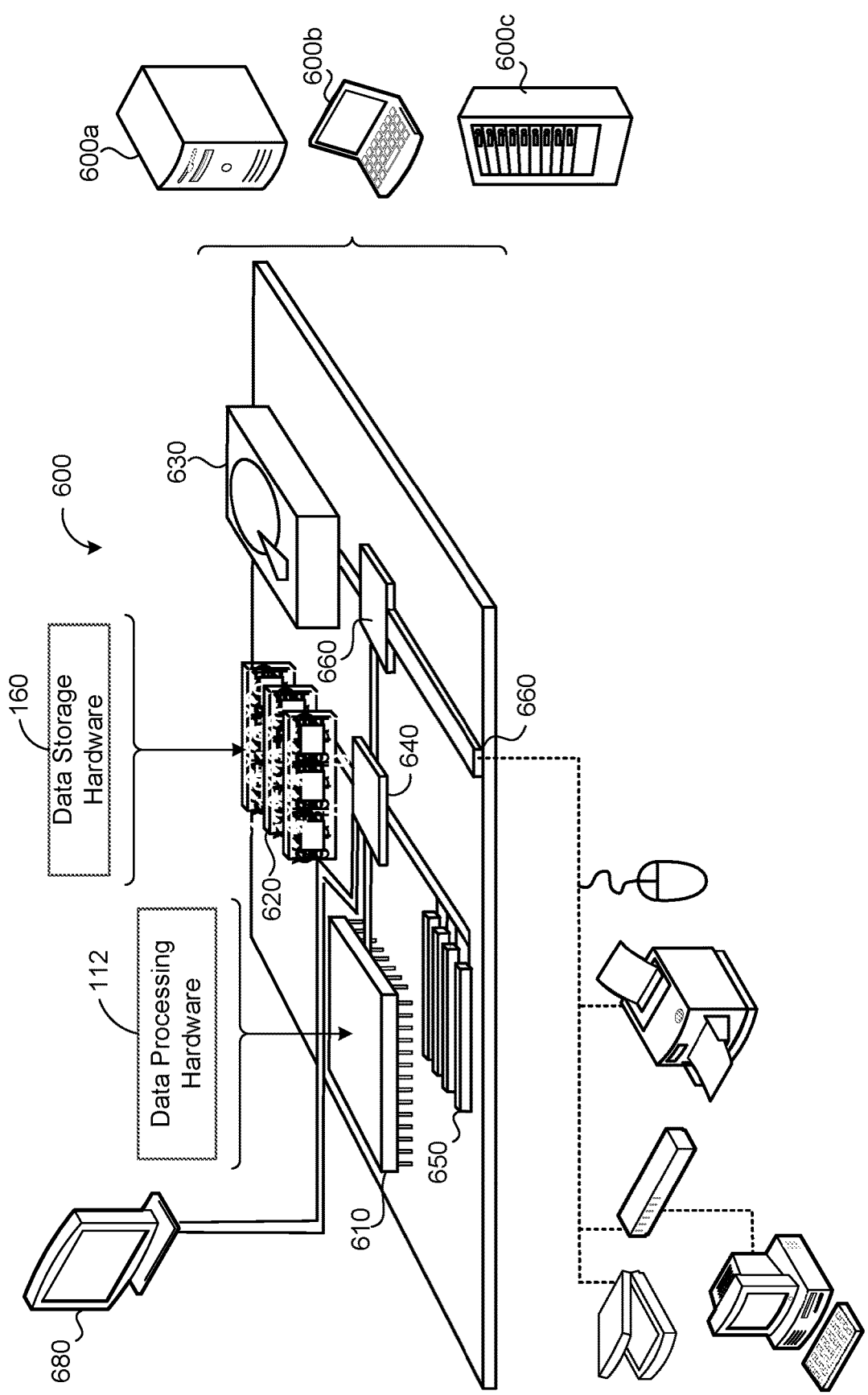
FIG. 6 is an example computing device.

FIG. 6 is a schematic view of an example computing device 600 that may be used to implement the systems and methods described in this document, such as the computing resource 112. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 600 includes a processor 610 (i.e., data processing hardware), memory 620, a storage device 630, a high-speed interface/controller 640 connecting to the memory 620 and high-speed expansion ports 650, and a low speed interface/controller 660 connecting to a low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a GUI on an external input/output device, such as a display 680 coupled to a high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 includes hardware (e.g., data storage hardware 160) that stores information non-transitorily within the computing device 600. The memory 620 may be a computer-readable medium, a volatile memory unit(s), or non-volatile memory unit(s). The non-transitory memory 620 may be physical devices (e.g. hardware) used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

A software application (i.e., a software resource 110) may refer to computer software that causes a computing device to perform a task. In some examples, a software application may be referred to as an "application," an "app," or a "program." Example applications include, but are not limited to, mobile applications, system diagnostic applications, system management applications, system maintenance applications, word processing applications, spreadsheet applications, messaging applications, media streaming applications, social networking applications, and gaming applications.

The memory hardware 110 may be physical devices used to store programs (e.g., sequences of instructions) or data (e.g., program state information) on a temporary or permanent basis for use by a computing device 110*hc*. The non-transitory memory hardware 110 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
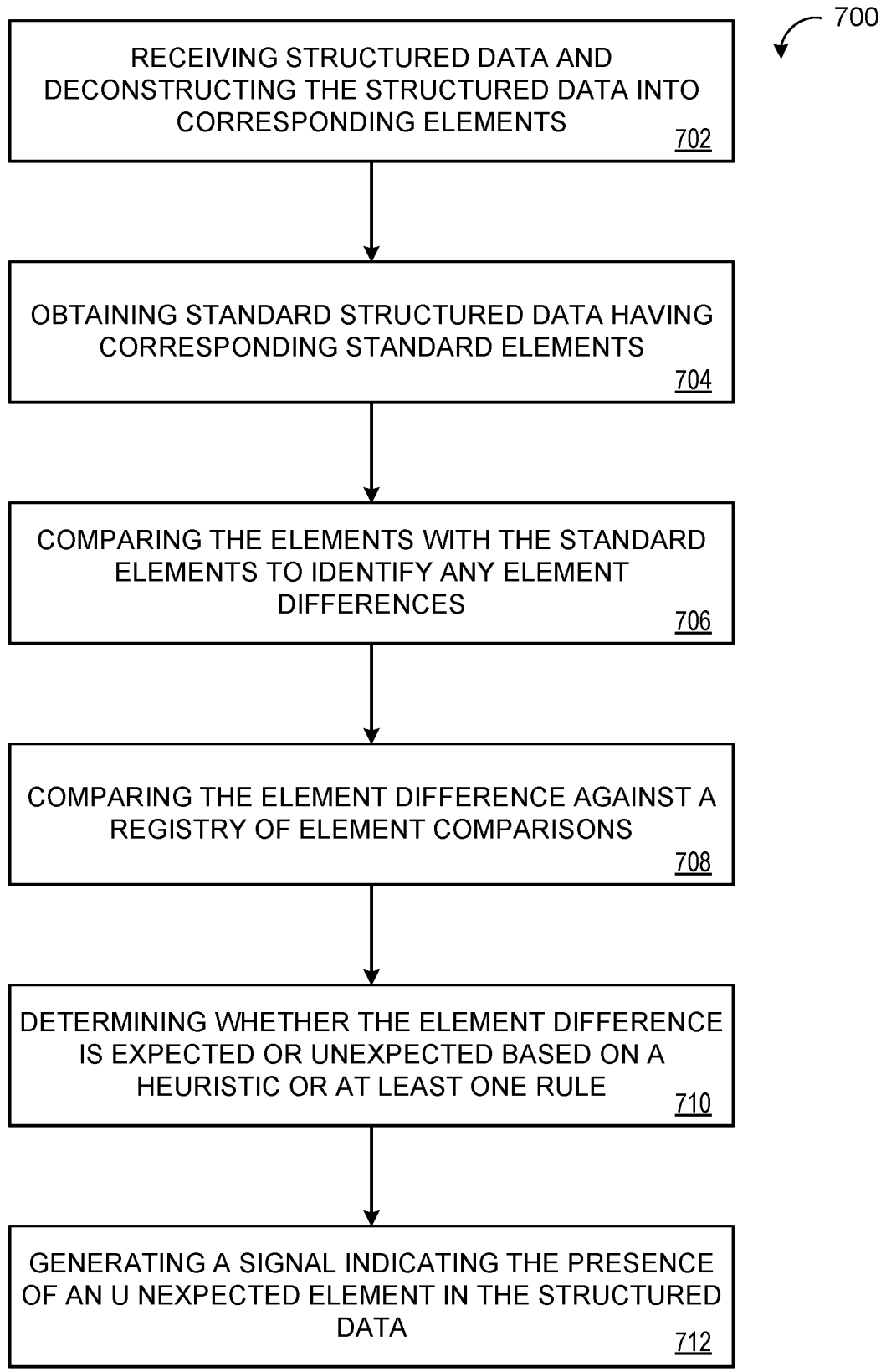
FIG. 7 is a flowchart of an example method for verifying structured data.

FIG. 7 is a flowchart of an example method 700 executed by the computing device 600 of FIG. 6 for verifying structured data 200. The flowchart starts at operation 702 by receiving structured data 200 at data processing hardware 112 (executing on the computing device 600) and deconstructing, by the data processing hardware 112, the structured data 200 into corresponding elements 210 (and any sub-elements 220). The data processing hardware 112 may execute a verifier 150 that implements a deconstructor 300, a structured data comparator 400, an analyzer 500, and an alarm module 170. The data processing hardware 112 may use the deconstructor 300 to deconstruct the structured data 200. A verification device 180 in communication with the verifier 150 may request the verifier 150, e.g., via an input 190, to verify the structured data 200 from one or more user devices 102 in a fleet. At operation 704, the data processing hardware 112 obtains standard structured data 250 having corresponding standard elements 260 (and any sub-elements 270). The data processing hardware 112 may obtain the standard structured data 250 from a standard structured data registry 162 residing on the data storage hardware 160. Here, the data processing hardware 112 may retrieve the standard structured data 250 having the same one or more attributes 202 as the attributes 202 associated with the structured data 200. At operation 706, the data processing hardware 112 compares (e.g., using the structured data comparator 400) the elements/sub-elements 210, 220 of the structured data 200 with the standard elements/sub-elements 260, 270 of the standard structured data to identify any element differences 430.

At operation 708, for each element difference, the data processing hardware 122 (e.g., using the analyzer 500) compares the element difference 430 against a registry of element comparisons 164, and at step 710, determines whether the element difference 430 is expected or unexpected based on a heuristic or at least one rule. The registry of element comparisons 164 may include the most current state of element differences 430 and a corresponding whitelist 540 including a rule indicating whether or not the element differences 430 is expected or unexpected. The whitelist 540 may be automatically generated by the data processing hardware 112 as samples of structured data 200 pass through the verifier 150 and/or existing whitelists 540 may be continuously updated based on samples of structured data 200 passing through the verifier 150. At operation 712, the data processing hardware 112 generates (e.g., using the alarm module 170) a signal 172 indicating the presence of an unexpected element/sub-element 210, 220 in the structured data 200. The verification device 180 may receive the signal 172 and cause a user interface 182 to display the indication of the presence of the unexpected element/sub-element 210, 220 in the structured data 200 on a display 184.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
    obtaining a first element of structured data, the first element comprising a first value of an attribute;
    receiving, for the first element of the structured data:
        a standard element indicating a value of a master copy of the first element of the structured data; and
        a tolerance indicating a threshold amount that the first element is allowed to deviate from the standard element;
    comparing the first element to the standard element;
    adjusting, based on the comparison of the first element to the standard element, the tolerance;
    receiving a second element of structured data, the second element comprising a second value of the attribute;
    determining, based on the adjusted tolerance, that second element satisfies the threshold amount that the second element is allowed to deviate from the standard element; and
    in response to determining that the second element satisfies the threshold amount that the second element is allowed to deviate from the standard element, generating an alert indicating possible malicious activity.

2. The method of claim 1, wherein the operations further comprise identifying a hash corresponding to the first element.

3. The method of claim 2, wherein obtaining the first element is based on the hash.

4. The method of claim 1, wherein each of the first element and the second element is sourced from a different user device.

5. The method of claim 1, wherein the value comprises at least one of creator information, version information, or data type.

6. The method of claim 1, wherein the structured data comprises binary data.

7. The method of claim 1, wherein the operations further comprise annotating the second element as differing from the standard element.

8. The method of claim 1, wherein the operations further comprise:
    receiving a third element of structured data, the third element comprising a third value of the attribute;
    determining, based on the adjusted tolerance, that the third element fails to satisfy the threshold amount that the third element is allowed to deviate from the standard element; and
    in response to determining that the third element fails to satisfy the threshold amount that the third element is allowed to deviate from the standard element, annotating the third element to indicate that the third element matches the standard element.

9. The method of claim 1, wherein the operations further comprise:
    obtaining an indication that the second element is not a result of malicious code; and
    updating a registry to include the second element of structured data.

10. The method of claim 9, wherein the registry logs elements of structured data over a period of time from multiple computing devices.

11. A system comprising:
    data processing hardware; and
    memory hardware in communication with the data processing hardware, the memory hardware storing instructions that when executed on the data processing hardware cause the data processing hardware to perform operations comprising:
        obtaining a first element of structured data, the first element comprising a first value of an attribute;
        receiving, for the first element of the structured data:
            a standard element indicating a value of a master copy of the first element of the structured data; and
            a tolerance indicating a threshold amount that the first element is allowed to deviate from the standard element;
        comparing the first element to the standard element;
        adjusting, based on the comparison of the first element to the standard element, the tolerance;
        receiving a second element of structured data, the second element comprising a second value of the attribute;
        determining, based on the adjusted tolerance, that second element satisfies the threshold amount that the second element is allowed to deviate from the standard element; and
        in response to determining that the second element satisfies the threshold amount that the second element is allowed to deviate from the standard element, generating an alert indicating possible malicious activity.

12. The system of claim 11, wherein the operations further comprise identifying a hash corresponding to the first element.

13. The system of claim 12, wherein obtaining the first element is based on the hash.

14. The system of claim 11, wherein each of the first element and the second element is sourced from a different user device.

15. The system of claim 11, wherein the value comprises at least one of creator information, version information, or data type.

16. The system of claim 11, wherein the structured data comprises binary data.

17. The system of claim 11, wherein the operations further comprise annotating the second element as differing from the standard element.

18. The system of claim 11, wherein the operations further comprise:
    receiving a third element of structured data, the third element comprising a third value of the attribute;
    determining, based on the adjusted tolerance, that the third element fails to satisfy the threshold amount that the third element is allowed to deviate from the standard element; and
    in response to determining that the third element fails to satisfy the threshold amount that the third element is allowed to deviate from the standard element, annotating the third element to indicate that the third element matches the standard element.

19. The system of claim 11, wherein the operations further comprise:
    obtaining an indication that the second element is not a result of malicious code; and
    updating a registry to include the second element of structured data.

20. The system of claim 19, wherein the registry logs elements of structured data over a period of time from multiple computing devices.

* * * * *